US008758128B2

(12) United States Patent
Prins et al.

(10) Patent No.: US 8,758,128 B2
(45) Date of Patent: Jun. 24, 2014

(54) BUTTON PANEL AND LIGHT ASSEMBLY FOR USE WITH GAMING MACHINES

(75) Inventors: Sonia L. Prins, Reno, NV (US); Chauncey Warner Griswold, Reno, NV (US); Joseph Daniel Stoddard, Reno, NV (US); Samuel Rey Abeyta, Reno, NV (US); Jean Pierre Legras, Carson City, NV (US); Kehl Tomas LeSourd, Reno, NV (US)

(73) Assignee: IGT, Las Vegas, NV (US)

( * ) Notice: Subject to any disclaimer, the term of this patent is extended or adjusted under 35 U.S.C. 154(b) by 538 days.

(21) Appl. No.: 12/565,311

(22) Filed: Sep. 23, 2009

(65) Prior Publication Data

US 2011/0070949 A1 Mar. 24, 2011

(51) Int. Cl.
*A63F 13/08* (2006.01)

(52) U.S. Cl.
USPC .............................................. 463/31; 463/46

(58) Field of Classification Search
USPC ........................................ 463/46, 37, 31, 47
See application file for complete search history.

(56) References Cited

U.S. PATENT DOCUMENTS

| | | | | |
|---|---|---|---|---|
| 4,163,883 | A * | 8/1979 | Boulanger | 200/314 |
| 4,517,558 | A * | 5/1985 | Davids | 345/629 |
| D488,839 | S * | 4/2004 | Bristol et al. | D21/369 |
| 6,722,985 | B2 * | 4/2004 | Criss-Puszkiewicz et al. | 463/29 |
| D515,144 | S * | 2/2006 | Boyd | D21/369 |
| D568,414 | S * | 5/2008 | Myers | D21/370 |
| 7,390,259 | B2 | 6/2008 | Okada | |
| 7,837,557 | B2 * | 11/2010 | Boyd | 463/31 |
| D631,100 | S * | 1/2011 | Palmisano | D21/385 |
| 2006/0022951 | A1 | 2/2006 | Hull | |
| 2006/0166728 | A1 | 7/2006 | Cornell et al. | |
| 2006/0178205 | A1 * | 8/2006 | Bleich et al. | 463/22 |
| 2007/0155511 | A1 * | 7/2007 | Grundstedt et al. | 463/46 |
| 2008/0058086 | A1 * | 3/2008 | Saffari et al. | 463/20 |
| 2008/0113741 | A1 * | 5/2008 | Beadell et al. | 463/20 |
| 2009/0131142 | A1 * | 5/2009 | Kelly | 463/19 |
| 2009/0312091 | A1 * | 12/2009 | Kato et al. | 463/25 |
| 2010/0022298 | A1 * | 1/2010 | Kukita | 463/25 |
| 2010/0120534 | A1 * | 5/2010 | Borissov et al. | 463/37 |
| 2011/0201411 | A1 * | 8/2011 | Lesley et al. | 463/25 |

* cited by examiner

*Primary Examiner* — Arthur O Hall
*Assistant Examiner* — Allen Chan
(74) *Attorney, Agent, or Firm* — Foley & Lardner LLP

(57) ABSTRACT

A gaming machine includes a button panel having a front surface, wherein at least a portion of the front surface is an optically restrictive material, and a plurality of light devices aligned relative to the optically restrictive material. The gaming machine also includes a controller coupled to the plurality of light devices, wherein the controller is configured to control at least one of an order of illumination for at least a portion of the plurality of light devices and a duration of illumination for at least a portion of the plurality of light devices.

38 Claims, 7 Drawing Sheets

BUTTON PANEL AND LIGHT ASSEMBLY FOR USE WITH GAMING MACHINES

TECHNICAL FIELD OF THE INVENTION

The embodiments described herein relate generally to gaming machines and, more particularly, to a partially light-reflective or partially opaque button panel that may be used with a gaming machine to present lighting effects to a player or potential player.

At least some known gaming machines include a button panel that includes one or more buttons with a single multi-colored light emitting diode (LED) or multiple LEDs of various colors positioned directly beneath the buttons or embedded within a body of each of the buttons. For example, at least some known button panels include a separate area that provides interactive buttons and a number of LEDs positioned beneath and around the buttons. The LEDs spaced about the buttons illuminate an area beneath a surface of the button panel such that the light emitted from the LEDs passes through the buttons to provide a glowing sensation to a player. As such, the LEDs positioned beneath the buttons provide a backlight for the buttons. However, known gaming machines do not provide lighting effects that accentuate selected groups of buttons and/or create display patterns that move between buttons.

BRIEF DESCRIPTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a gaming machine is provided. The gaming machine includes a button panel, a plurality of light devices, and a controller coupled to the light devices. The button panel includes a front surface, with at least a portion of the front surface having an optically restrictive material. The light devices are aligned relative to the optically restrictive material. The controller is configured to control at least one of an order of illumination for at least a portion of the light devices and a duration of illumination for at least a portion of the light devices.

In another aspect, a display panel assembly is provided for use with a gaming machine that includes a gaming machine controller. The display panel assembly includes a display panel having a front surface, wherein at least a portion of the front surface includes an optically restrictive material, and a plurality of light devices positioned with respect to the optically restrictive material. The light devices are configured to be selectively energized and de-energized to facilitate presenting a lighting effect.

In yet another aspect, a method is provided for selectively displaying a lighting effect using a gaming machine that includes a button panel, a plurality of light devices configured to display the lighting effect, and a controller coupled to the light devices. The method includes applying an optically restrictive material across at least a portion of the button panel, and aligning the light devices relative to the optically restrictive material. The method also includes detecting a trigger using the controller, and transmitting control signals to at least a portion of the light devices responsive to the detection of the trigger to generate the lighting effect.

In another aspect, a gaming system is provided. The gaming system includes a plurality of gaming machines and at least one server coupled to the gaming machines via a network. Each gaming machine includes a button panel having a front surface that includes an optically restrictive material, a plurality of light devices aligned relative to the optically restrictive material, and a gaming machine controller coupled to the light devices. The server is configured to initiate a lighting effect by controlling at least one of an order of illumination, an intensity of illumination, and a duration of illumination for at least a portion of the light devices.

BRIEF DESCRIPTION OF THE DRAWINGS

The embodiments described herein may be better understood by referring to the following description in conjunction with the accompanying drawings.

DETAILED DESCRIPTION

Figure 1:
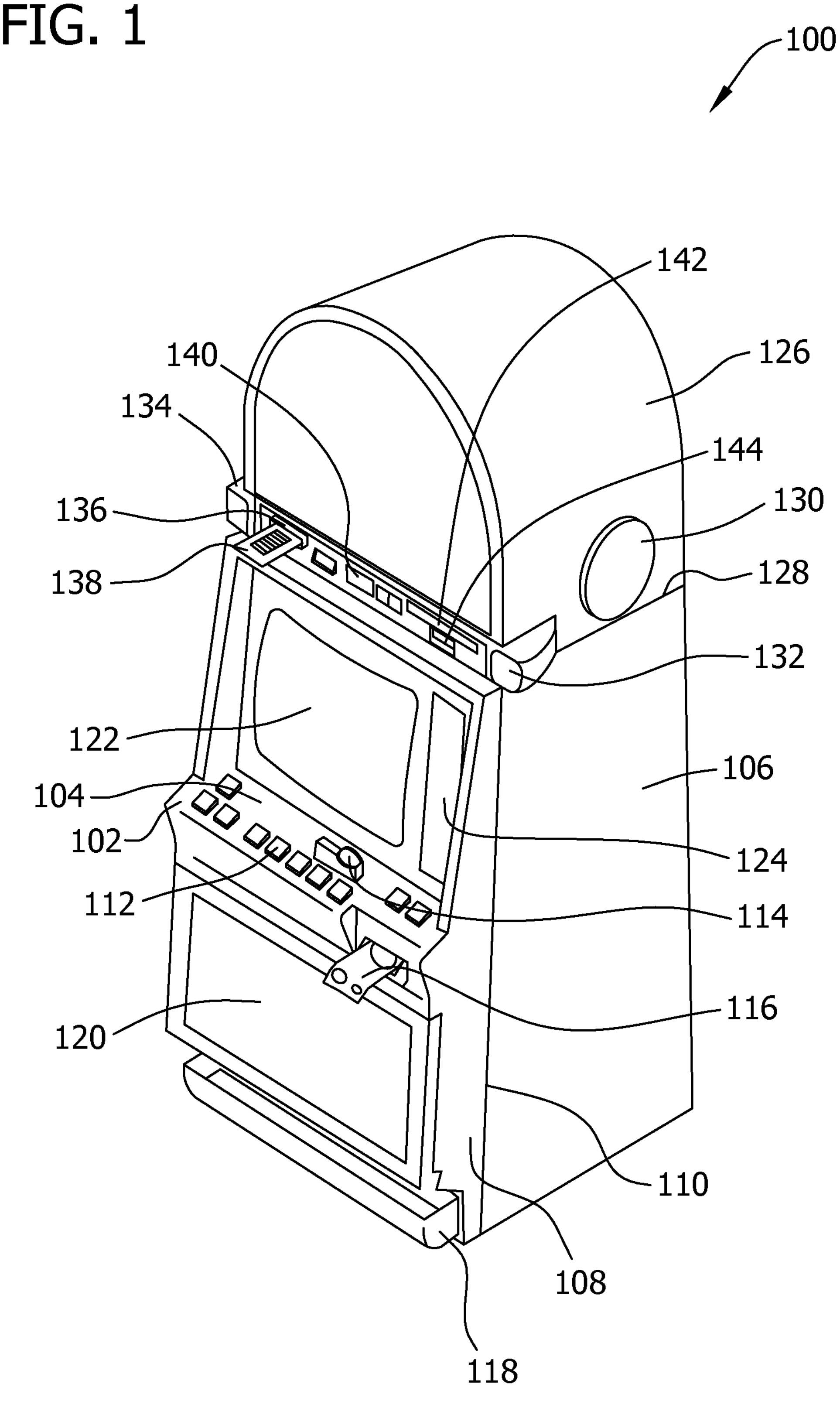
FIG. 1 is a schematic diagram of an exemplary gaming machine.

Exemplary applications of systems, methods, and apparatus according to the present invention are described herein. These examples are provided solely to add context and to aid in the understanding of the invention. It will thus be apparent to one skilled in the art that the present invention may be practiced without some or all of these specific details. In other instances, well known process steps have not been described in detail in order to avoid obscuring the present invention. Other applications are possible, such that the following examples should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Various embodiments of the invention described herein use a wireless transmission protocol to communicate control signals from a wireless transmitter coupled to a gaming machine controller to a wireless receiver of a lighting controller. Examples of such wireless transmission protocols include, but are not limited to only including, infrared (IR) light, Bluetooth®, and ZigBee® (Bluetooth® is a registered trademark of Bluetooth SIG, Inc., Bellevue, Wash., USA, and ZigBee® is a registered trademark of ZigBee Alliance Corporation, San Ramon, Calif., USA). However, one of ordinary skill in the art will appreciate that any other suitable wireless transmission protocol may be used in the embodiments described below.

Technical effects of the systems, methods, and apparatus described herein include at least one of (a) applying an optically reflective material or an optically opaque material across at least a portion of a button panel of a gaming machine, wherein the optically reflective or opaque material may be a metallic substance applied via vapor deposition, a polarized glass coupled to or integrally formed with the button panel, a type of film applied to the button panel, or an integrally-formed portion of the button panel; (b) positioning a plurality of light devices with respect to the optically reflective or opaque material; (c) detecting a trigger using a controller, wherein the trigger relates to a status or state of the gaming machine, a game play outcome, a prompt during game play, or a bonus game triggering event; (d) transmitting a control signal to the light devices from the controller to generate a lighting effect; and (e) controlling an order in which the light devices are illuminated, an intensity with which the light devices are illuminated, and/or a time duration of illumination for the light devices.

In some embodiment, the term "optically restrictive material" refers generally to a material that is applied to a surface or coupled to a surface to prevent external visibility into a gaming machine and/or to facilitate displaying a lighting effect to a player or potential player of the gaming machine. The optically restrictive material may be reflective in nature, such as mirrored or partially mirrored. For example, a reflective material may be applied or coupled to a button panel such that one or more portions of the button panel are fully mirrored and one or more portions of the button panel are partially mirrored. In some instances, the partially mirrored portions may include color filters. Alternatively, the optically restrictive material may be opaque in nature.

FIG. 1 is a schematic diagram of an exemplary gaming machine 100 that includes a button panel 102 having a front surface 104, and a plurality of light devices (not shown in FIG. 1) positioned with respect to button panel 102. More specifically, the plurality of light devices is positioned with respect to front surface 104 to facilitate presenting a lighting effect to a player or potential player of gaming machine 100. Gaming machine 100 may be any type of gaming machine, and may include different structures than those shown in FIG. 1. Moreover, gaming machine 100 may use different methods of operation than those described below.

In the exemplary embodiment, gaming machine 100 includes a main cabinet 106 that includes a main door 108 coupled to a front 110 of gaming machine 100 via a hinge (not shown). When opened, door 108 provides access to an interior (not shown) of gaming machine 100. In the exemplary embodiment, a plurality of player-input switches and/or buttons 112 is coupled to main door 108. Moreover, in the exemplary embodiment, a coin acceptor 114, for accepting coins and/or tokens, a bill acceptor 116, for accepting and/or validating cash bills, coupons, and/or ticket vouchers, a coin tray 118 for collecting a coin-based payout, and a belly glass 120 are each coupled to main door 108. A video display 122 and an information panel 124 are viewable through main door 108. In the exemplary embodiment, video display 122 is implemented via a plurality of lighting devices (not shown in FIG. 1), such as a light emitting diode (LED) lighting display. However, in alternative embodiments, video display 122 may be implemented as a cathode ray tube (CRT), a flat-panel liquid crystal display (LCD), a plasma display, an organic light-emitting diode (OLED) display, and/or any other electronically-controlled video display that incorporates a plurality of light devices. Moreover, video display 122 may include touch screen capabilities. In the exemplary embodiment, information panel 124 is a back-lit, silk screened glass panel that includes lettering indicative of general game information including, for example, a number of coins wagered. Coin acceptor 114, bill acceptor 116, player-input buttons 112, video display 122, and information panel 124 are each used by a player to play a game on gaming machine 100. Each component 112, 114, 116, 122, and/or 124 is controlled by a gaming machine controller (not shown in FIG. 1) that is housed inside main cabinet 106. Numerous games including, but not limited to only including, video slot games, video poker, video pachinko, video black jack, video card games, and/or video keno may be implemented for play on gaming machine 100.

In the exemplary embodiment, gaming machine 100 also includes a top box 126 that is positioned on a top surface 128 of main cabinet 106. In the exemplary embodiment, top box 126 includes a number of devices that may be used to add features to a game being played on gaming machine 100. Such devices may include, but are not limited to only including, speakers 130, 132, and 134, a ticket printer 136 for printing bar-coded tickets 138, a key pad 140 for entering player tracking information, or player preferences or characteristics, a display 142 for displaying player tracking information and/or player preferences or characteristics, and a card reader 144 for receiving a card containing player tracking information and/or player preferences or characteristics encoded thereon. Card reader 144 may also be used to accept credit cards, printed cards, smart cards, and/or other magnetic stripe cards. Moreover, top box 126 may house additional devices not shown in FIG. 1, such as, for example, a bonus wheel, a secondary video display, and/or a back-lit silk screened panel that may be used to add bonus features to a game being played on gaming machine 100. During game play, such devices may be controlled by circuitry, such as the gaming machine controller housed within main cabinet 106.

Moreover, in the exemplary embodiment, button panel 102 is fabricated at least partially from an optically restrictive material, such as an optically reflective material or an optically opaque material. More specifically, in the exemplary embodiment, the optically restrictive material extends across at least a portion of front surface 104. In the exemplary embodiment, button panel 102 is fabricated, at least in part, from a film of a metallic or metalized substance, such as chrome, titanium, gold, or silver. However, it should be understood that any metallic or metalized substance may be used. Moreover, in the exemplary embodiment, a film is applied to a plastic or glass panel body using, for example, vapor deposition. In an alternative embodiment, the film is an adhesive-backed laminate that is applied to either an inner surface (not shown in FIG. 1) of front surface 104 or to an outer surface (not shown) of front surface 104. The laminate may also be coupled to button panel 102, either to front surface 104 or to the outer surface. In another alternative embodiment, button panel 102 includes polarized glass that substantially prevents external visibility into gaming machine 100. In yet another alternative embodiment, button panel 102 is fabricated using an in-mold decorating process.

Figure 2:
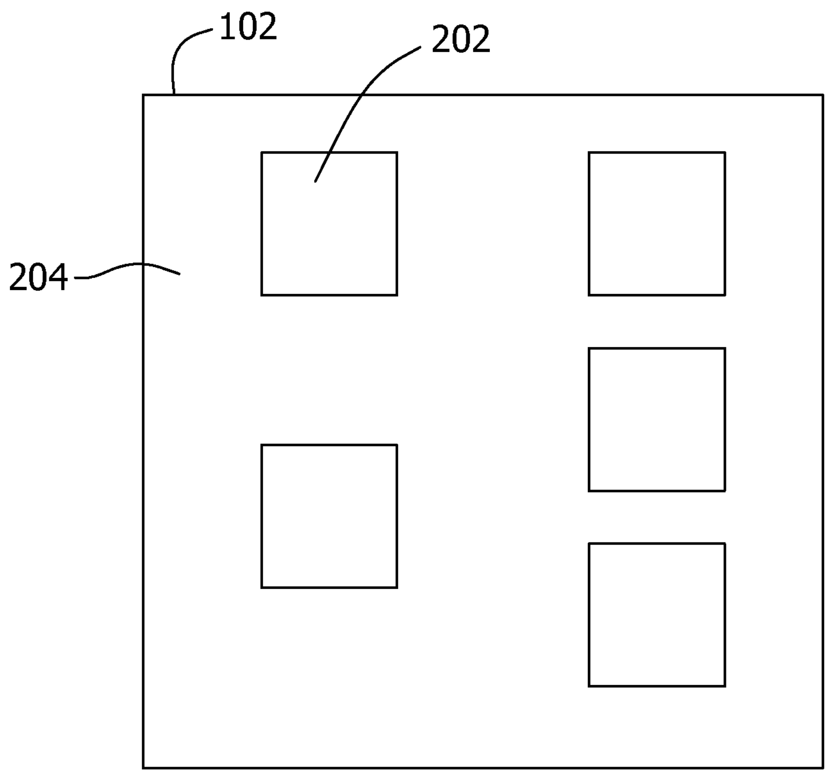
FIG. 2 is a bottom view of an exemplary embodiment of a button panel that may be used with the gaming machine shown in FIG. 1.

FIG. 2 is a bottom view of an exemplary embodiment of button panel 102. In the exemplary embodiment, a first plurality of openings 202 is formed in button panel 102. Specifically, openings 202 extend through button panel 102 from an inner surface 204 to an outer surface (not shown). A respective button 112 (shown in FIG. 1) is positioned and substantially aligned with each opening 202 such that each button 112 may be inserted through opening 202. In the exemplary embodiment, the plurality of light devices (not shown) is arranged adjacent inner surface 204 with respect to buttons 112. Moreover, in the exemplary embodiment, button panel 102 is fabricated as a single piece, wherein the optically restrictive material is integrally formed with button panel 102 via, for example, an in-mold decorating process.

Figure 3:
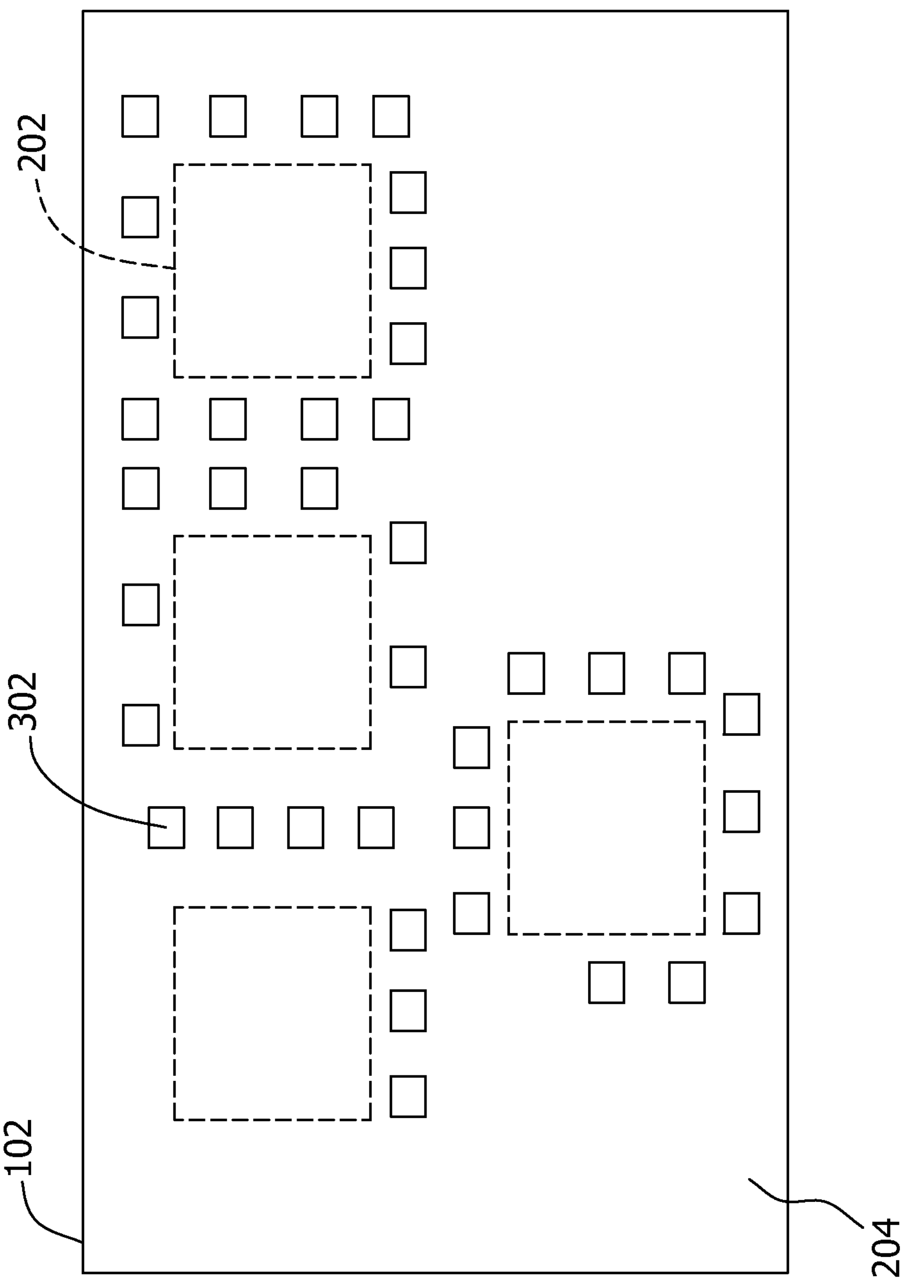
FIG. 3 is a bottom view of an alternative embodiment of a button panel that may be used with the gaming machine shown in FIG. 1.

FIG. 3 is a bottom view of an alternative embodiment of button panel 102, wherein button panel 102 and the optically restrictive material are separate bodies. For example, the optically restrictive material may be applied to inner surface 204 or coupled to inner surface 204 of button panel 102. In one embodiment, button panel 102 is fabricated from, for example, a plastic or glass. The optically restrictive material is then applied to inner surface 204 via vapor deposition, or is then coupled to inner surface 204. In the exemplary embodiment, openings 202 extend through button panel 102 as shown in FIG. 2. Openings 202 also extend through the optically restrictive material. In addition, a second plurality of openings 302 is defined. Specifically, in the exemplary embodiment, openings 302 extend at least partially through the optically restrictive material. For example, each opening 302 extends at least partially through the optically restrictive material towards inner surface 204 of button panel 102, without extending through inner surface 204 of button panel 102. Each of the plurality of light devices (not shown) is positioned and substantially aligned with respect to a respective opening 202 and 302. In one embodiment, openings 302 are formed by removing a portion of the optically restrictive material via a laser cutting process, for example. In another embodiment, openings 302 are formed by removing a portion of the optically restrictive material via at least one of a water jet cutting process, a photo etching process, and a punching process.

Figure 4:
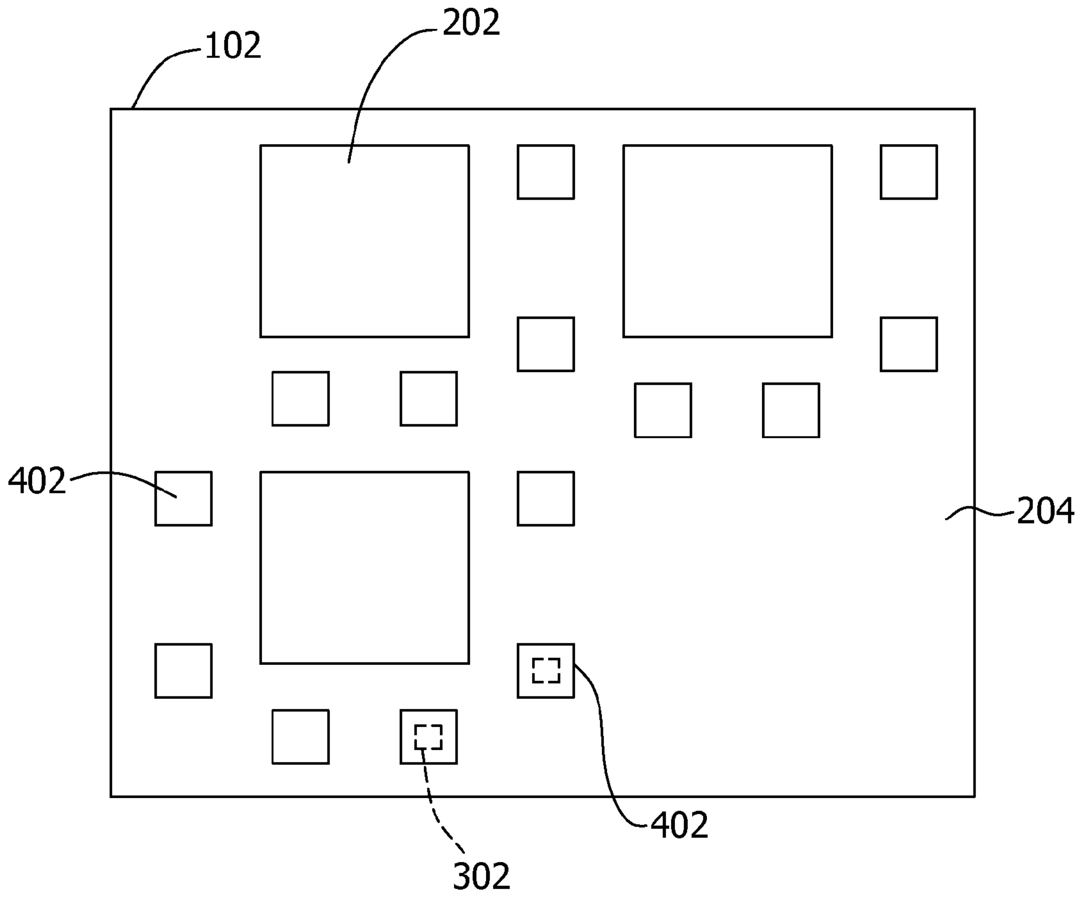
FIG. 4 is a bottom view of another alternative embodiment of a button panel that may be used with the gaming machine shown in FIG. 1.

FIG. 4 is a bottom view of another alternative embodiment of button panel 102, wherein button panel 102 and the optically restrictive material are separate bodies. For example, as described above, the optically restrictive material may be applied to inner surface 204 or coupled to inner surface 204 of button panel 102. In one embodiment, button panel 102 is fabricated from, for example, a plastic or glass. The optically restrictive material is then applied to inner surface 204 via vapor deposition, or is then coupled to inner surface 204. In the exemplary embodiment, openings 202 extend through button panel as shown in FIG. 2. Openings 202 also extend through the optically restrictive material. In addition, a plurality of filters 402 is positioned along an inner surface (not shown) of the optically restrictive material. Each of the plurality of light devices (not shown) is positioned with respect to a respective filter 304. In one embodiment, at least a portion of filters 304 are colored filters. In some embodiments, openings 302 are also formed in the optically restrictive material, as described above. In one such embodiment, filter 402 is aligned with respect to a respective opening 302 and with respect to a light device. Moreover, in some embodiments, filters 402 are formed with pre-selected shapes, such as letters, numbers, or other shapes, such as but not limited to, animals.

Figure 5:
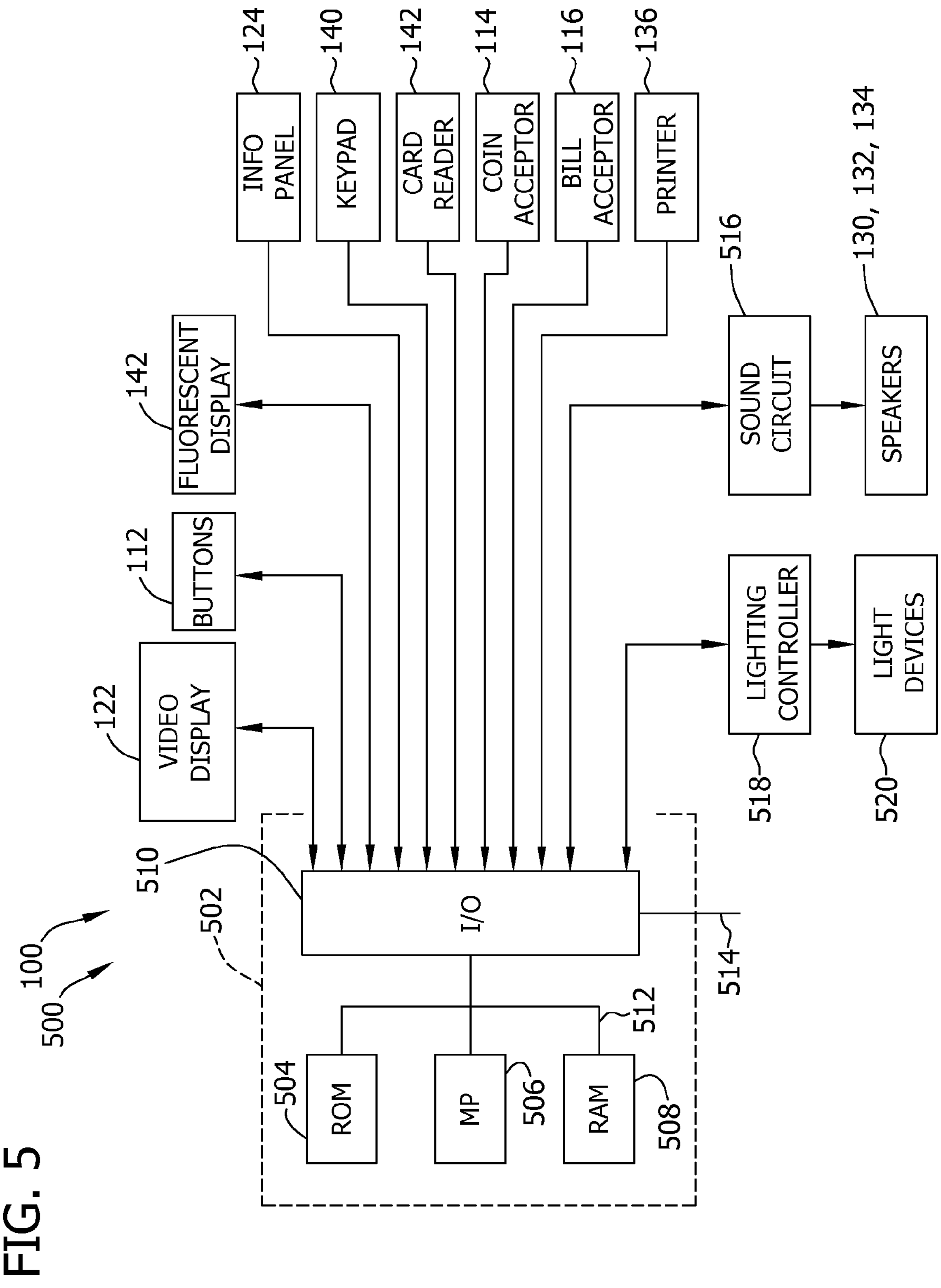
FIG. 5 is a block circuit diagram of an exemplary electrical architecture that may be used with the gaming machine shown in FIG. 1.

FIG. 5 is a block circuit diagram of an exemplary electrical architecture 500 incorporated into an exemplary gaming machine, such as gaming machine 100. In the exemplary embodiment, gaming machine 100 includes a gaming machine controller 502 that includes a read-only memory (ROM) 504, a microcontroller or microprocessor (MP) 506, a random-access memory (RAM) 508, and an input/output (I/O) circuit 510, that are each coupled via an address/data bus 512. As used herein, the terms “controller” and “processor” may include any programmable system including, but not limited to, systems using microcontrollers, reduced instruction set circuits (RISC), application specific integrated circuits (ASICs), logic circuits, and/or any other circuit or processor capable of executing the functions described herein. Such examples are exemplary only, and are thus not intended to limit in any way the definition and/or meaning of the terms “controller” or “processor”. Alternative embodiments of controller 502 may include more than one microprocessor 506, multiple RAM modules 508, and/or multiple ROM modules 504. Moreover, although I/O circuit 510 is illustrated in FIG. 5 as being a single component, one of ordinary skill in the art should appreciate that I/O circuit 510 may include any number or a plurality of different types of I/O circuits. Furthermore, RAM 508 and/or ROM 504 may be implemented as, for example, semiconductor memories, magnetically readable memories, and/or optically readable memories.

In one embodiment, each operational component of gaming machine 100 is coupled to I/O circuit 510 via a respective conductor and/or via bus 512. Alternative embodiments may include only a single coupling between the operational components of gaming machine 100 and I/O circuit 510. In the exemplary embodiment, I/O circuit 510 is coupled to a gaming network (not shown) via a network interface 514.

Moreover, in the exemplary embodiment, architecture 500 includes a sound circuit 516 that generates audio signals and that communicates audio signals between I/O circuit 510 and speakers 130, 132, and/or 134. In the exemplary embodiment, controller 502 transmits a control signal to a plurality of light devices 520 to initiate a lighting effect. In some embodiments, architecture 500 also includes a lighting controller 518 that receives display control signals from controller 502 and that transmits control signals to light devices 520. More specifically, controller 502 transmits a control signal to lighting controller 518 to initiate a lighting effect. Lighting controller 518 then transmits the control signal to at least a portion of light devices 520. In the exemplary embodiment, controller 502 transmits the control signal to lighting controller 418 via a wired connection. Wired control signal transmissions may be made using various communication protocols such as USB, Ethernet, CAN-bus, or any other suitable wired communication protocol. In an alternative embodiment, controller 502 transmits the control signal to lighting controller 418 via a wireless connection. Wireless control signal transmissions may be made using various wireless communication protocols such as, and without limitation, infrared (IR) signals, Bluetooth signals, ZigBee signals, or any other suitable wireless communication protocol. In the exemplary embodiment, light devices 520 are light emitting diodes (LEDs). However, any suitable light device may be used, such as an organic LED (OLED).

Moreover, in the exemplary embodiment, light devices 520 emit colored light, such as blue, red, green, and/or any other suitable color. In an alternative embodiment, light devices 520 emit light of a full-spectrum color. For example, light devices 520 may emit only white light when used in conjunction with color filters 402. In another alternative embodiment, light devices 520 are grouped together such that light devices 520 of different colors may be illuminated at different times to facilitate creating the appearance of multiple color lights at the same location. In the exemplary embodiment, light devices 520 are coupled in, for example, a daisy-chain formation, wherein a first light device 520 and a last light device 520 in the chain are each coupled to gaming machine controller 502 or to lighting controller 518.

During operation, gaming machine controller 502 detects a trigger condition. In the exemplary embodiment, a trigger condition may be caused, for example, by gaming machine 100 being unoccupied by a player, a winning outcome during play of a base game, detection of a bonus game triggering event, and/or a logical next step for a player. Based on the type and/or timing of the trigger condition, gaming machine 100 presents a lighting effect using light devices 520. More specifically, in the exemplary embodiment, gaming machine controller 502 transmits a control signal to at least a portion of light devices 520 based on the type and/or timing of the trigger condition. During the lighting effect, gaming machine controller 502 controls, for example, an order in which light devices 520 are illuminated, an intensity with which light devices 520 are illuminated, and/or a time duration in which light devices 520 are illuminated. Gaming machine controller 502 may also control a brightness level with which light devices 520 are illuminated.

In some embodiments, gaming machine controller 502 transmits a control signal to lighting controller 518 to initiate a lighting effect. Lighting controller 518 then transmits the control signal to at least a portion of light devices 520. In one embodiment, gaming machine controller 502 transmits the control signal to lighting controller 418 via a wired connection. In an alternative embodiment, gaming machine controller 502 transmits the control signal to lighting controller 418 via a wireless connection. During the lighting effect, lighting controller 518 controls, for example, an order in which light devices 520 are illuminated, an intensity with which light devices 520 are illuminated, and/or a time duration in which light devices 520 are illuminated. Lighting controller 518 may also control a brightness level with which light devices 520 are illuminated.

Exemplary lighting effects include, without limitation, an attract sequence displayed to potential players of gaming machine 100, a celebration sequence, and/or a prompt sequence. Such sequences may include patterned displays of multiple illuminated light devices 520. For example, during an attract sequence, a series of light devices 520 may be illuminated around one or more buttons 112 and/or around an outer edge of button pane 102 to reflect a name of the game or a possible prize that may be won. A celebration sequence may include a patterned display in which a series of light devices 520 are progressively illuminated to simulate a celebratory fireworks display. A prompt sequence may include a series of light devices 520 illuminated around a perimeter of a particular button 112 to direct a player's attention towards, for example, a SPIN button. Similarly, a prompt sequence may include a series of light devices 520 illuminated around a perimeter of each of a group of buttons 112 to direct a player's attention towards buttons 112 that designate a number of lines to select, or a wager amount for each selected line.

Figure 6:
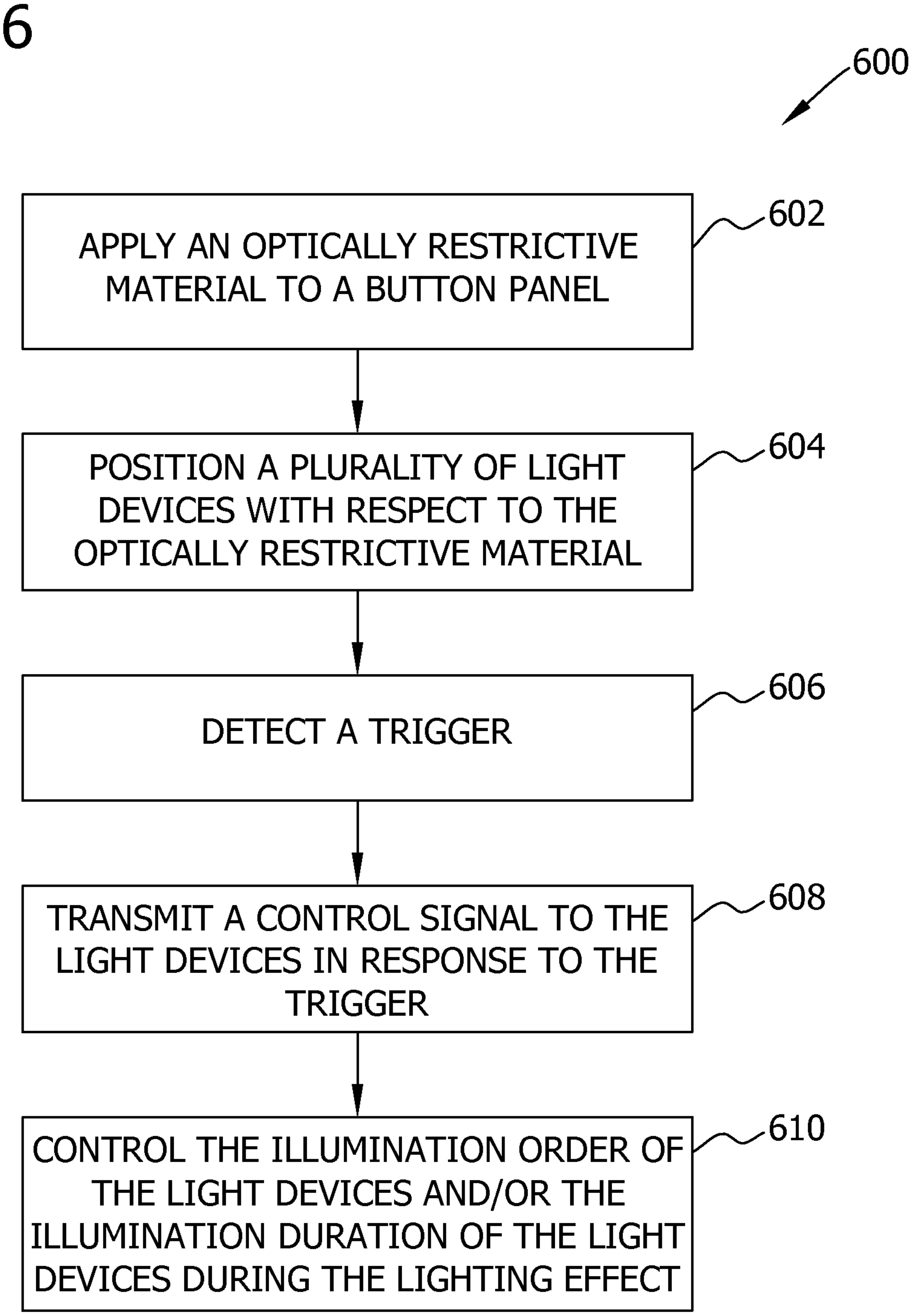
FIG. 6 is a flowchart illustrating an exemplary method for selectively displaying a lighting effect using the gaming machine shown in FIG. 1.

FIG. 6 is a flowchart 600 illustrating an exemplary method for selectively displaying a lighting effect using gaming machine 100 (shown in FIG. 1). In the exemplary embodiment, an optically restrictive material is applied 602 to at least a portion of button panel 102 (shown in FIGS. 1-4). In the exemplary embodiment, the optically restrictive material is an optically reflective material. In an alternative embodiment, the optically restrictive material is an optically opaque material. In one embodiment, the optically restrictive material is applied to inner surface 204 (shown in FIGS. 2-4) of button panel 102 via vapor deposition such that a film of a metallic substance, such as chrome, titanium, gold, and/or silver is applied. However, it should be understood that any metallic or metalized substance may be used. In an alternative embodiment, the optically restrictive material is applied via an adhesive-backed laminate, such as a tape or other suitable material that is applied to either inner surface 204 or an outer surface (not shown) of button panel 102. In another alternative embodiment, button panel 102 includes polarized glass that prevents external visibility into gaming machine 100. In yet another alternative embodiment, button panel 102 is fabricated via an in-mold decorating process.

In the exemplary embodiment, a plurality of light devices 520 (shown in FIG. 5) are positioned 604 with respect to the optically restrictive material of button panel 102. In some embodiments, a plurality of openings 302 (shown in FIG. 3) is formed in button panel 102, and each light device 520 aligned with respect to a respective opening 302. In one embodiment, openings 302 are formed using a laser cutting process. In another embodiment, openings 302 are formed using other fabrication techniques including, but not limited to, a water jet cutting process, a photo etching process, and/or a punching process. Moreover, in some embodiments, a plurality of color filters 402 (shown in FIG. 4) is positioned with respect to the optically restrictive material. In some embodiments, each light device 520 is aligned with respect to a respective filter 402.

In the exemplary embodiment, gaming machine controller 502 (shown in FIG. 5) detects 606 a trigger. Examples of triggers include, but are not limited to only including, an unoccupied gaming machine 100, a winning outcome in a base game, a bonus game triggering event, a waiting period, during game play and/or an elapsed time period. However, it should be understood that any suitable game event may be detected by gaming machine controller 502 for use in initiating a lighting effect as described herein. Based on, for example, a type of trigger detected and/or a timing of trigger detection, gaming machine controller 502 transmits 608 a control signal to light devices 520 to generate a lighting effect. During the lighting effect, gaming machine controller 502 controls 610 an order in which light devices 520 are illuminated, and intensity with which light devices 520 are illuminated, and/or a time duration for which light devices 520 are illuminated. In an alternative embodiment, gaming machine controller 502 transmits a control signal to lighting controller 518 (shown in FIG. 5) to generate a lighting effect. During the lighting effect, lighting controller 518 controls the order in which light devices 520 are illuminated, the intensity with which light devices 520 are illuminated, and/or the time duration for which light devices 520 are illuminated. It should be understood that gaming machine controller 502 and/or lighting controller 518 may also control any suitable operational aspect of light devices 520 during the lighting effect.

Figure 7:
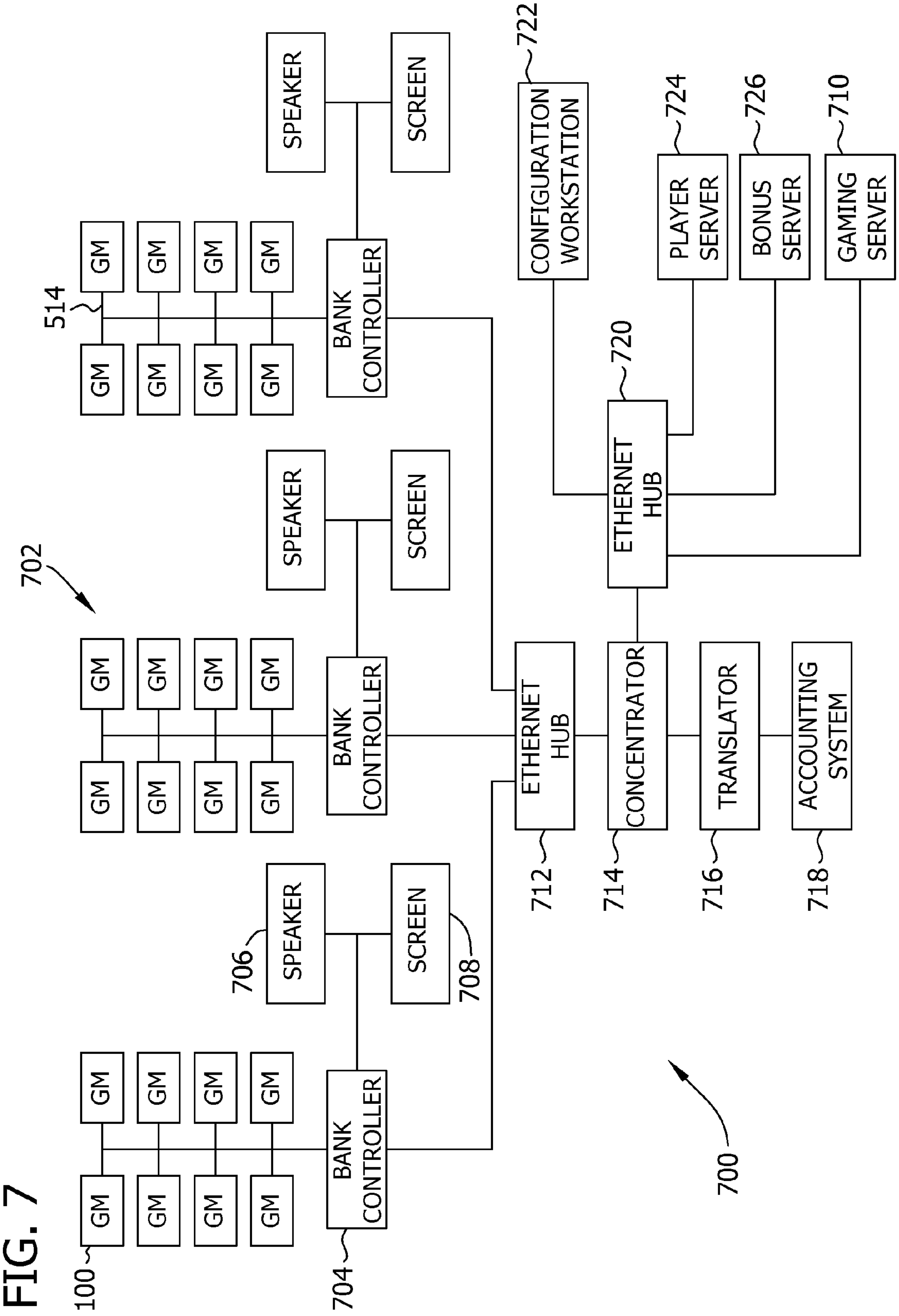
FIG. 7 is a block diagram of an exemplary gaming network that includes a plurality of the gaming machines shown in FIG. 1.

FIG. 7 is a block diagram of an exemplary gaming network 700 that includes a plurality of gaming machines 100. Specifically, FIG. 7 shows three banks 702 of gaming machines 100. Each gaming machine 100 is coupled via a network connection 514 to a bank controller 704. In one embodiment, each bank controller 704 includes a processor (not shown) that facilitates data communication between each gaming machine 100 coupled within each bank 702, and between each gaming machine 100 and other components of gaming network 700. In one embodiment, each bank controller 704 also includes audio capabilities, such as a CD-ROM drive (not shown) or DVD-ROM drive (not shown), that are coupled to a sound card (not shown) for processing and transmitting digitized sound effects to one or more speakers (not shown) in response to commands issued over gaming network 700 by bank controller 704. Each bank controller 704 is also coupled via gaming network 700 to a speaker 706 and/or an electronic sign or screen 708 that displays information, such as via scrolling and/or flashing messages that indicate, for example, progressive and/or jackpot amounts, and that are visible to players playing gaming machines 100. Messages for display on each electronic screen 708 are generated and/or modified in response to commands issued over gaming network 700 by bank controller 704. A portion of gaming machines 100 may include video poker machines, video slot machines, and/or other similar gaming machines that implement alternative games, wherein the actual games, including random number generation and/or outcome determination, are performed at a remote gaming server 710.

A network connector, such as an Ethernet hub 712, couples each bank controller 704 to a concentrator 714. Concentrator 714 functions as a data control switch that routes data from each bank 702 to a translator 716. Translator 716 provides a compatibility buffer (not shown) between concentrator 714 and an accounting system 718. Moreover, translator 716 converts data gathered from each bank 702 into a format that is compatible with accounting system 718.

Another Ethernet hub 720 couples concentrator 714 to a configuration workstation 722, a player server 724, and to one or more bonus servers 726. Configuration workstation 722 includes a user interface that enables an administrator to set up and/or to modify portions of gaming network 700 and/or servers 710, 724, and 726. Player server 724 tracks data of players using gaming machines 100. Player server 724 also controls messages that appear on each video display 122 and/or information panel 124 of gaming machines 100. In the exemplary embodiment, player server 724 also stores physical characteristics of players, such as the player age and/or vision data. Bonus server 726 controls bonus applications or bonus systems on gaming network 700. Bonus server 726 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

During operation, gaming network 700 operates substantially similar to gaming machine 100. In some instances, gaming machine controller 502 detects that gaming machine 100 has been unoccupied for a predetermined time period, and initiates an attract sequence by transmitting a control signal to light devices 520 (shown in FIG. 5). Alternatively, gaming server 710 detects that gaming machine 100 has been unoccupied, and transmits a control signal to gaming machine controller 502 via network 514. Gaming machine controller 502 initiates an attract sequence in response to the control signal as described above. Moreover, in some instances, an outcome of a particular gaming machine 100 may include one of a number of predetermined triggering events. Such triggering events may include a particular combination of symbols, or any other suitable game event that may be desired. In the exemplary embodiment, game server 710 and/or bonus server 726 detect such triggering events and transmit a control signal to gaming machine controller 202 of one or more gaming machines 100 to initiate a lighting effect as described above.

Gaming server 710 or bonus server 726 transmits the control signal to one or more gaming machine controllers 502 via network. In turn, each gaming machine controller 502 transmits a control signal to light devices 520 that at least a portion of light devices 520 should be illuminated for a predetermined period of time. In an alternative embodiment, gaming machine controller 502 transmits a control signal to lighting controller 518 (shown in FIG. 5). Lighting controller 518 controls an order of illumination, in intensity of illumination, and/or a time duration of illumination for at least a portion of light devices 520 based on the control signal.

The systems, methods, and apparatus described herein facilitate presenting a lighting effect to a player or potential player of a gaming machine using a plurality of light devices positioned beneath a button panel. The lighting effect may be an attract sequence, an aid to distinguish which buttons on the button panel are active and which are inactive during play, to portray dynamic assignment of button groups during play, to display a celebration sequence in response to a winning outcome of a base game or bonus game, and/or to display a bonus game triggering event celebration sequence. Using lighting effects generated by light devices positioned beneath the button panel facilitates reducing costs of parts and labor during assembly of a gaming machine. Using lighting effects generated by light devices positioned beneath the button panel further facilitates reducing the costs of parts and labor involved in servicing and/or replacing worn or damaged gaming machines. Moreover, such lighting effects facilitate dynamically modifying celebrations, attract sequences, and the like based on, for example, a game title currently in play at a particular gaming machine.

When introducing elements of aspects of the invention or embodiments thereof, the articles “a,” “an,” “the,” and “said” are intended to mean that there are one or more of the elements. The terms “comprising,” including,” and “having” are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine comprising:

a button panel comprising a front surface, at least a portion of said front surface comprising an optically restrictive material, the optically restrictive material prevents external visibility into an interior of the button panel from the front surface;

one or more first openings extending through the button panel;

one or more buttons respectively inserted through the one or more first openings;

a plurality of second openings in the button panel, the plurality of second openings positioned around a perimeter of at least one of the one or more first plurality of openings, the plurality of second openings extending from a back surface of the button panel and extending partially through the button panel such that the plurality of second openings do not extend through the front surface;

a plurality of light devices aligned relative to said optically restrictive material, the plurality of light devices positioned within the plurality of second openings and around a perimeter of at least one of the one or more buttons such that the plurality of light devices are configured to display patterns on an area of the button panel not occupied by the one or more buttons; and a controller coupled to said plurality of light devices, said controller configured to control at least one of an order of illumination for at least a portion of said plurality of light devices and a duration of illumination for at least a portion of said plurality of light devices.

2. A gaming machine in accordance with claim 1, wherein said optically restrictive material comprises a film applied across at least a portion of said front surface.

3. A gaming machine in accordance with claim 2, wherein said film comprises a metallic substance applied via a vapor deposition process.

4. A gaming machine in accordance with claim 2, wherein said film comprises an adhesive-backed laminate.

5. A gaming machine in accordance with claim 2, wherein the plurality of second openings extend at least partially through said film without extending through the front surface.

6. A gaming machine in accordance with claim 5, wherein each of said first and second openings is formed by removing a portion of said film using at least one of a laser cutting process, a water jet cutting process, a photo etching process, and a punching process.

7. A gaming machine in accordance with claim 2, wherein said film comprises a plurality of color filters, each of said plurality of light devices is positioned relative to a respective filter.

8. A gaming machine in accordance with claim 1, wherein said optically restrictive material comprises a polarized glass.

9. A gaming machine in accordance with claim 1, wherein said button panel is fabricated via an in-mold decorating process.

10. A gaming machine in accordance with claim 1, wherein said optically restrictive material comprises an optically reflective material which is at least partially mirrored.

11. A gaming machine in accordance with claim 1, wherein said optically restrictive material comprises an optically opaque material.

12. A gaming machine in accordance with claim 1, wherein said controller is configured to cause at least a portion of said plurality of light devices to present an attract sequence to potential players.

13. A gaming machine in accordance with claim 1, wherein said controller is configured to cause at least a portion of said plurality of light devices to present an announcement to a player related to one of a base game and a bonus game.

14. A gaming machine in accordance with claim 1, wherein said controller is configured to cause at least a portion of said plurality of light devices to present prompts to a player related to game play.

15. A gaming machine in accordance with claim 1, wherein said controller is configured to control an intensity of illumination for at least a portion of said plurality of light devices.

16. A gaming machine in accordance with claim 1, wherein said controller comprises a gaming machine controller and a lighting controller coupled to said gaming machine controller and to said plurality of light devices, said lighting controller configured to control at least one of an order of illumination, an intensity of illumination, and a duration of illumination for at least a portion of said plurality of light devices.

17. A display panel assembly for use with a gaming machine that includes a gaming machine controller, said display panel assembly comprising:

a display panel comprising a front surface, at least a portion of said front surface comprising an optically restrictive material, the optically restrictive material prevents external visibility into an interior of the button panel from the front surface;

one or more first openings extending through the display panel;

one or more buttons respectively inserted through the one or more first openings; and a plurality of second openings in the display panel, the plurality of second openings positioned around a perimeter of at least one of the one or more first plurality of openings, the plurality of second openings extending from a back surface of the display panel and extending partially through the display panel such that the plurality of second openings do not extend through the front surface;

a plurality of light devices aligned relative to said optically restrictive material, said plurality of light devices positioned within the plurality of second openings and around a perimeter of at least one of the one or more buttons, said plurality of light devices configured to be selectively energized and de-energized to facilitate presenting a pattern on an area of the display panel not occupied by the one or more buttons.

18. A display panel assembly in accordance with claim 17, wherein said optically restrictive material comprises a film applied across at least a portion of said front surface.

19. A display panel assembly in accordance with claim 18, wherein said film comprises a metallic substance applied via a vapor deposition process.

20. A display panel assembly in accordance with claim 18, wherein said film comprises an adhesive-backed laminate.

21. A display panel assembly in accordance with claim 18, wherein the plurality of second openings extend at least partially through said film without extending through the front surface.

22. A display panel assembly in accordance with claim 18, wherein said film comprises a plurality of color filters, each of said plurality of light devices is positioned relative to a respective filter.

23. A display panel assembly in accordance with claim 17, wherein said optically restrictive material comprises a polarized glass.

24. A display panel assembly in accordance with claim 17, wherein said display panel is fabricated via an in-mold decorating process.

25. A display panel assembly in accordance with claim 17, wherein said optically restrictive material comprises an optically reflective material which is at least partially mirrored.

26. A display panel assembly in accordance with claim 17, wherein said optically restrictive material comprises an optically opaque material.

27. A display panel assembly in accordance with claim 19, further comprising a lighting controller coupled to the gaming machine controller and to said plurality of light devices, said lighting controller configured to control at least one of an order of illumination, an intensity of illumination, and a duration of illumination for at least a portion of said plurality of light devices to facilitate presenting the lighting effect.

28. A gaming system comprising:

a plurality of gaming machines, at least some of the gaming machines comprising:

a button panel comprising a front surface, at least a portion of said front surface comprising an optically restrictive material, the optically restrictive material prevents external visibility into an interior of the button panel from the front surface;

one or more first openings extending through the button panel;

one or more buttons respectively inserted through the one or more first openings;

a plurality of second openings in the button panel, the plurality of second openings positioned around a perimeter of at least one of the one or more first plurality of openings, the plurality of second openings extending from a back surface of the button panel and extending partially through the button panel such that the plurality of second openings do not extend through the front surface;

a plurality of light devices aligned relative to said optically restrictive material, the plurality of light devices positioned within the plurality of second openings and around a perimeter of at least one of the one or more buttons such that the plurality of light devices are configured to display patterns on an area of the button panel not occupied by the one or more buttons; and a gaming machine controller coupled to said plurality of light devices; and at least one server coupled to said plurality of gaming machines via a network, said at least one server configured to initiate a lighting effect by controlling at least one of an order of illumination, an intensity of illumination, and a duration of illumination for at least a portion of said plurality of light devices.

29. A gaming system in accordance with claim 28, wherein said optically restrictive material comprises a film applied across at least a portion of said front surface.

30. A gaming system in accordance with claim 29, wherein said film comprises one of an adhesive-backed laminate and a metallic substance applied via a vapor deposition process.

31. A gaming machine in accordance with claim 29, wherein the plurality of openings extend at least partially through said film without extending through the front surface.

32. A gaming system in accordance with claim 29, wherein said film comprises a plurality of color filters, each light device of said plurality of light devices aligned relative to a respective filter.

33. A gaming system in accordance with claim 28, wherein said optically restrictive material comprises a polarized glass.

34. A gaming system in accordance with claim 28, wherein said optically restrictive material comprises one of an optically reflective material which is at least partially mirrored.

35. A gaming system in accordance with claim 28, wherein said at least one server is configured to:

detect that a particular gaming machine of said plurality of gaming machines is unoccupied; and cause at least a portion of said plurality of light devices of said particular gaming machine to present an attract sequence to potential players.

36. A gaming system in accordance with claim 28, wherein said at least one server is configured to:

detect a trigger during play of a base game; and cause at least a portion of said plurality of light devices to present an announcement to a player related to one of the base game and a bonus game initiated in response to the trigger.

37. A gaming system in accordance with claim 30, wherein said at least one server is configured to cause at least a portion of said plurality of light devices to present prompts to a player related to game play.

38. A gaming system in accordance with claim 28, wherein said at least one server is configured to initiate the lighting effect across at least a portion of said gaming machines.

* * * * *

UNITED STATES PATENT AND TRADEMARK OFFICE

CERTIFICATE OF CORRECTION

PATENT NO. : 8,758,128 B2
APPLICATION NO. : 12/565311
DATED : June 24, 2014
INVENTOR(S) : Sonia L. Prins et al.

It is certified that error appears in the above-identified patent and that said Letters Patent is hereby corrected as shown below:

IN THE CLAIMS

In Claim 1, Column 10, Line 51, replace “prevents” with --preventing--.
In Claim 1, Column 10, Line 60, delete “plurality of”.
In Claim 7, Column 11, Line 31, before “filter” insert --color--.
In Claim 17, Column 12, Line 3, replace “prevents” with --preventing--.
In Claim 17, Column 12, Line 4, replace “button” with --display--.
In Claim 17, Column 12, Line 9, delete “and”.
In Claim 17, Column 12, Line 12, delete “plurality of”.
In Claim 17, Column 12, Line 18, after “;” insert --and--.
In Claim 22, Column 12, Line 42, between “respective” and “filter” insert --color--.
In Claim 27, Column 12, Line 61, replace “the” with --a--.
In Claim 28, Column 13, Line 1, replace “prevents” with --preventing--.
In Claim 28, Column 13, Line 10, delete “plurality of”.
In Claim 31, Column 14, Line 1, replace “machine” with --system--.
In Claim 31, Column 14, Line 2, between “of” and “openings” insert --second--.
In Claim 32, Column 14, Line 7, between “respective” and “filter” insert --color--.

Signed and Sealed this
Second Day of June, 2015

Michelle K. Lee

Michelle K. Lee
*Director of the United States Patent and Trademark Office*